Patented May 17, 1932

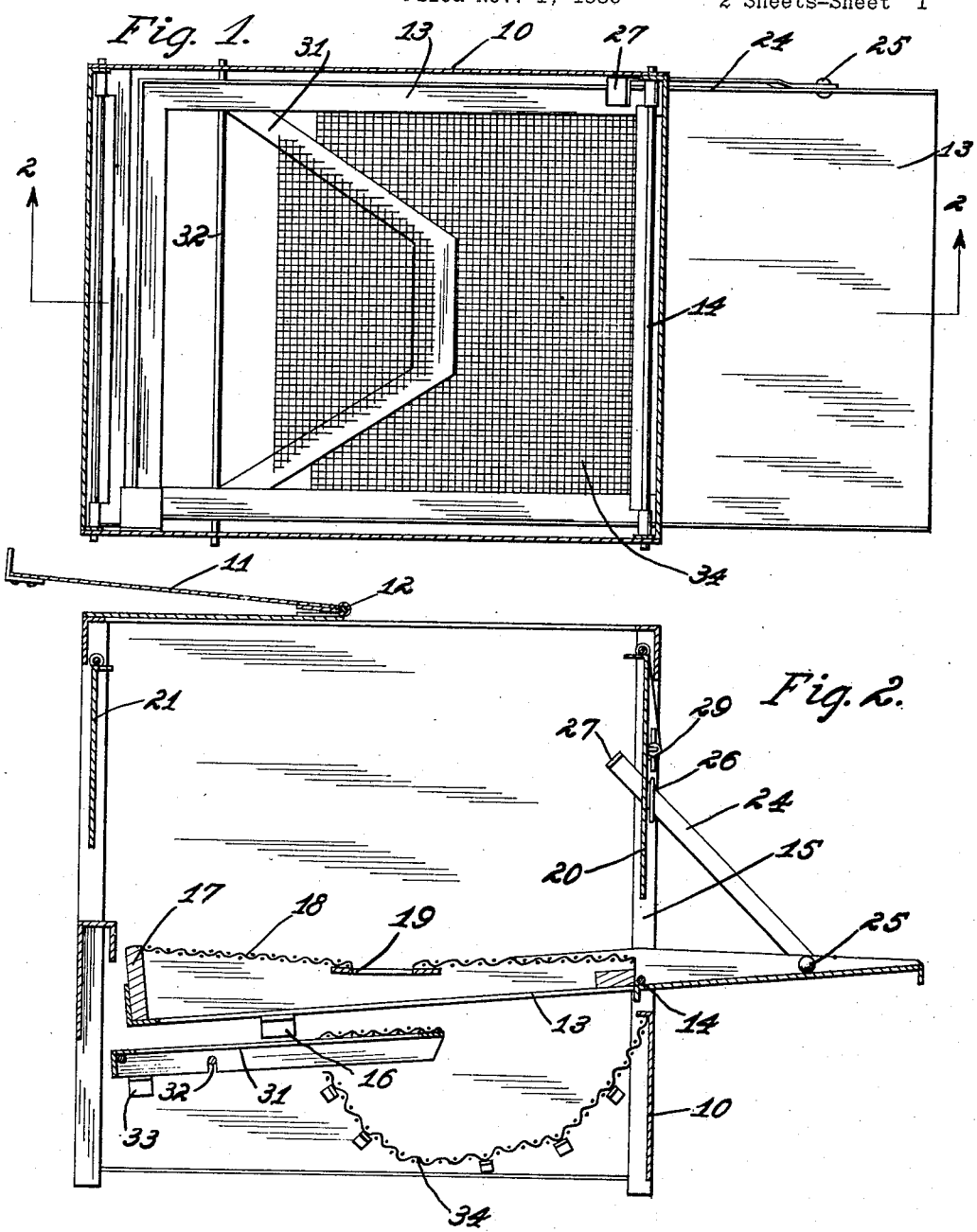

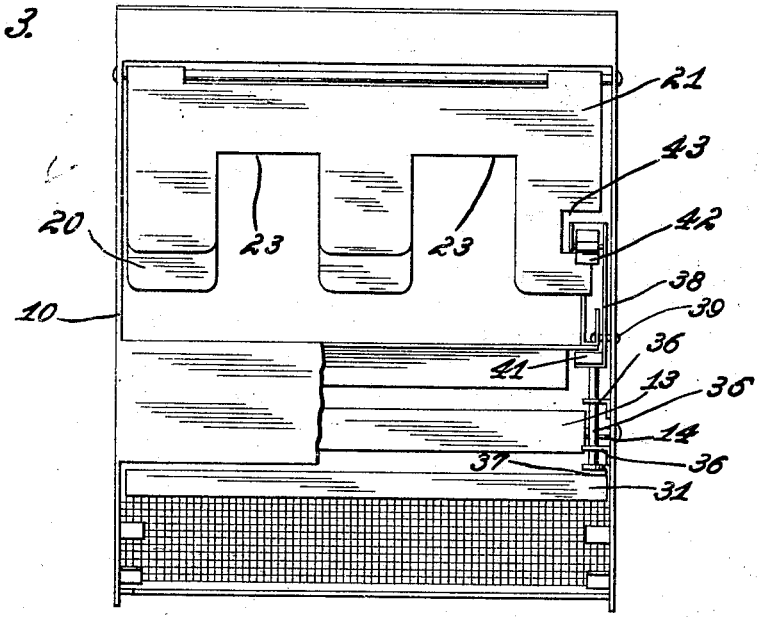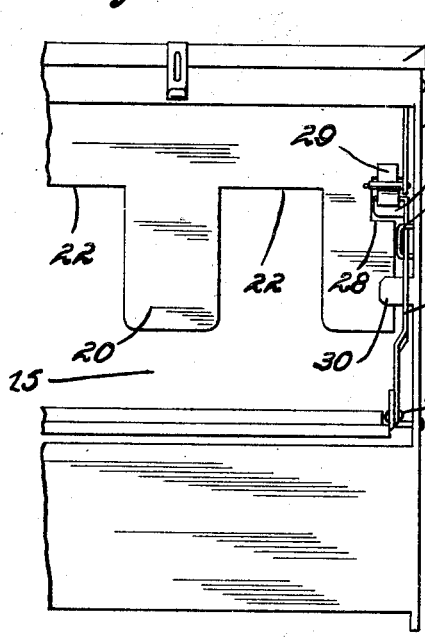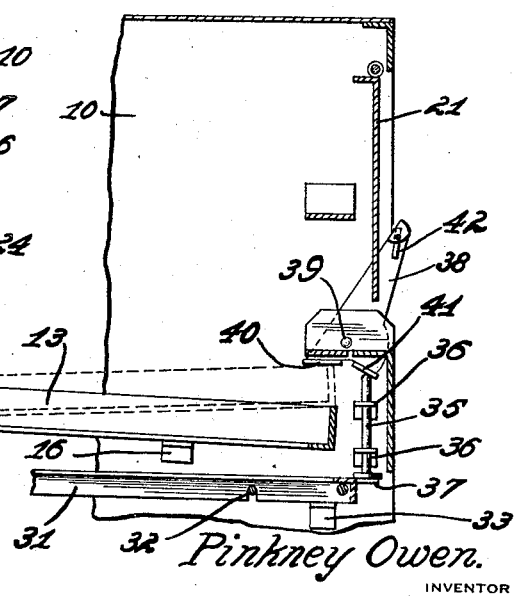

1,859,154

UNITED STATES PATENT OFFICE

PINKNEY OWEN, OF FRANKEWING, TENNESSEE

AUTOMATIC TRAP NEST

Application filed November 1, 1930. Serial No. 492,812.

This invention relates to improvements in poultry trap nests and which embodies among other characteristics the arrangement of doors at the ends of the trap.

Another object of the invention contemplates the provision and arrangement of a treadle arrangement for the nest of the trap whereby the exit door will be locked upon the occasion of a fowl entering the trap.

An additional object of the invention consists of a releasing mechanism for the exit door operable by the depositing of an egg.

More specifically stated the trap may be adjusted to imprison the fowl to facilitate recording each laying hen's leg band.

With the above and other objects in view, the invention further consists of the following novel features and details of construction, to be hereinafter more fully described, illustrated in the accompanying drawings and pointed out in the appended claims.

In the drawings:—

Figure 1 is a top plan view of the present invention with the cover removed.

Figure 2 is a longitudinal sectional view taken therethrough.

Figure 3 is a rear end elevation of the invention partly in section.

Figure 4 is a vertical detail sectional view taken through the rear portion of the trap illustrating the arrangement of the several locking and releasing mechanisms.

Figure 5 is a view similar to Figure 3 showing the operating mechanism for the front or entrance door for the trap.

Referring to the drawings in detail wherein like characters of reference denote corresponding parts, the reference character 10 indicates generally the body of trap which may be arranged in stacks or aligned in a partition between pens for the purpose of separating the laying hens from the non-layers. Access may be had to the entrance of the trap through the provision of a cover 11 hingedly mounted, as at 12, upon the trap body.

A treadle 13, pivotally and eccentrically mounted for rocking motion upon a shaft member 14 disposed within the entrance opening 15 of the trap, has the longer end thereof projected within the interior of the trap and normally seated upon supports 16 in the manner shown in Figures 2 and 4 of the drawings. A tray frame 17, supported upon that portion of the treadle 13 within the trap, carries a fabric covering 18 between the rails thereof which in turn is sloped downwardly and inwardly therefrom for communication with a ring 19.

Entrance and exit doors 20 and 21 respectively hingedly mounted for swinging motion within the respective entrance openings are slotted, as at 22 and 23, to permit inspection of the trap at a distance and to facilitate ventilation thereof. An arm member 24, pivotally mounted, as at 25, upon the outermost projecting portion of the treadle 13, is passed at its opposite end through a guide yoke 26 arranged upon the inner side of the entrance opening 15. An ear 27, rightangularly disposed upon the uppermost and inwardly projecting end of the link 24, is designed for registration with an opening 28 in the entrance door 20 when the outer portion of the treadle is depressed by a hen of average weight.

A trip lock 29 is mounted for locking movement upon and adjacent one of the side edges of the entrance door 20 and at a point in advance of the slot 28 provided in the door. This trip lock is operated by the engagement therewith of the ear 27 of the arm 24, when the door is moved to a closed position making the trap accessible to only one hen at a time. Stops 30 are arranged upon opposite sides of the entrance opening in the path of movement of the entrance door 20 and for contacting engagement therewith to prevent the hen from leaving the trap through the entrance opening.

A platform 31, tiltably and eccentrically mounted for rocking motion upon a rod member 32 within the trap and below the treadle 13, is normally seated at its heavier end upon ears 33 to dispose the lighter fabric covered end thereof immediately beneath the opening in the ring 19. A form of receptacle, such as indicated at 34, constructed of fabric, screen wire or the like, is arranged beneath the lighter end of the platform 31 to accommodate eggs in a manner about to be explained. A hen upon lying upon the outermost protruding end of the treadle 13 rocks the treadle at the pivot point 14 and retracts the links 24 sufficiently to dispose the offset end 27 thereof in alignment with the slot 28 in the entrance door 20. The hen then pushes against the entrance door 20 and enters the trap proper. Immediately upon the hen's passing over and beyond the pivot point 14 for the treadle, the innermost or heavier end of the treadle will descend to occupy the Figure 2 position, whereby the outermost projecting end of the treadle will be raised sufficiently to dispose the ear 27 in the path of movement of the trip lock 29.

The hen after entering the trap sets upon the fabric covering 18 stretched across the frame 17 and the egg laid will be induced to descend toward the center or lowermost inclined portion of the frame covering and pass through the opening in the ring 19 for contacting engagement with the fabric covered end of the platform 31. The platform will be rocked by this additional weight and dump or otherwise deposit the egg within the receptacle 34. The rocking motion of the platform 31, however, will be sufficient to shift a pin member 35 upwardly through the bores of the aligned ears 36. A tab or ear 37, arranged upon one end of the platform 31, is designed for engagement with the lowermost projecting end of the pin 35.

A lever 38, pivotally mounted, as at 39, upon the housing, has the obliquely arranged faces 40 and 41 respectively adjacent its lowermost end for contacting engagement with the treadle 13 and pin 35. The lever 38 is designed to be rocked upon the pivot 39 when the ears 40 and 41 are selectively and alternately engaged. A trip lock 42, pivotally supported upon the uppermost end of the lever 38, has its lowermost depending portion normally disposed in the path of movement of the exit door 21 to prevent any of the hens leaving the trap unless an egg were laid. The egg having been laid and tilting the platform 31, the pin 35 engaging the ear 41 of the lever 38 will then dispose the trip lock 42 in alignment with that of an opening 43 in the exit door 21 whereby the latter may be swung to occupy an open position as the hen leaves the trap.

Hens will also be prevented from entering the trap by way of the exit door inasmuch as the mounting for the lever 38 is disposed in the path of movement thereof.

It is also my purpose to arrange the trap so that the hens will be prevented from leaving same even after having laid an egg as it may be desirous to identify the band upon the laying hen's leg to tabulate the number of eggs laid per annum by each hen. In accomplishing the above, I provide slots in that portion of the platform 39 accommodating the shaft 32 whereby said platform may be removed and replaced at will in order that the pin 35 may be released. Without the pin 35, the lever 38 will remain in the Figure 3 position and the hen will not be allowed to leave the trap of its own volition.

The invention is susceptible of various changes in its form, proportions and minor details of construction and the right is herein reserved to make such changes as properly fall within the scope of the appended claims.

Having described the invention, what is claimed is:—

1. A trap nest comprising a body having swingably mounted entrance and exit doors, a treadle pivotally and eccentrically mounted within the body having a portion outwardly projected in advance of the entrance door normally operable to retain the exit door closed, an arm member actuated by the extended portion of the treadle having its opposite end offset and projected within the body, the entrance door having an opening in alignment with the offset end of the arm member, a trip lock carried by the entrance door and projected within said slot for contacting engagement with the offset end of the arm member to prevent more than one hen occupying the trap at one time, a tray for the treadle having a fabric covering therefor, a ring carried at the center of the covering and in communication with the uppermost inclined side thereof, a platform tiltably mounted beneath the covering having a fabric covered face disposed immediately beneath the opening in the ring for contacting engagement with eggs passed therethrough, and a trip mechanism operable by the platform for releasing the exit door.

2. A trip nest comprising a body having swingably mounted entrance and exit doors, a treadle pivotally and eccentrically mounted within the body having a portion outwardly projected in advance of the entrance door normally operable to retain the exit door closed, an arm member actuated by the extended portion of the treadle having its opposite end offset and projected within the body, the entrance door having an opening in alignment with the offset end of the arm member, a trip lock carried by the entrance door and projected within said slot for contacting engagement with the offset end of the arm member to prevent more than one hen occupying the trap at one time, a tray for the treadle having a fabric covering therefor, a ring carried at the center of the covering and in communication with the uppermost inclined side thereof, a platform titltably mounted beneath the covering having a fabric covered face disposed immediately beneath the opening in the ring for contacting engagement with eggs passed therethrough, a lever mounted upon the body supporting a trip lock within one end, the exit door having an opening to selectively accommodate said trip, and means carried by the treadle and platform for operative engagement with the lever for disposing said trip into and out of alignment with said opening.

3. A trap nest comprising a body having movably mounted entrance and exit doors, a treadle pivotally and eccentrically mounted within the body having a portion thereof extended outwardly and beyond the body in advance of the entrance door, an arm actuated by the extended portion of the treadle and provided with an offset projecting within the body, a trip lock carried by the entrance door and engaging with the offset end of the said arm, a platform movably mounted beneath the housed portion of the treadle for contacting engagement with eggs laid upon the treadle and a release mechanism for the exit door operable by said platform.

In testimony whereof I affix my signature.

PINKNEY OWEN.